United States Patent [19]

Van Abeelen et al.

[11] Patent Number: 4,568,712

[45] Date of Patent: Feb. 4, 1986

[54] HIGH IMPACT, HIGH MODULUS FIBER REINFORCED POLYMERS

[75] Inventors: Petrus C. A. M. Van Abeelen, Gilze; Jan Bussink, Bergen op Zoom; Jean M. H. Heuschen, Ha Halsteren, all of Netherlands

[73] Assignee: General Electric Co., Pittsfield, Mass.

[21] Appl. No.: 281,723

[22] Filed: Jul. 9, 1981

[51] Int. Cl.$^4$ .................................. C08K 5/54
[52] U.S. Cl. ............................ 524/267; 525/101
[58] Field of Search ...................... 524/267; 525/101

[56] References Cited

U.S. PATENT DOCUMENTS

| | | | |
|---|---|---|---|
| 3,749,757 | 7/1973 | Marzocchi | 525/101 |
| 3,971,756 | 7/1976 | Bialous et al. | 524/267 |
| 4,163,002 | 7/1979 | Pohl et al. | 528/274 |
| 4,239,677 | 12/1980 | Dieck | 525/439 |

Primary Examiner—Joseph L. Schofer
Assistant Examiner—N. Sarofim
Attorney, Agent, or Firm—Hedman, Gibson, Costigan & Hoare

[57] ABSTRACT

High impact, high modulus thermoplastic molding compositions comprise
(a) an aromatic carbonate polymer;
(b) a linear polyester;
(c) a fibrous reinforcing agent essentially free of any sizing agent; and
(d) a small amount of a polysiloxane having a substantial content of Si—H bonds.

1 Claim, No Drawings

HIGH IMPACT, HIGH MODULUS FIBER REINFORCED POLYMERS

This invention is directed to an improved polycarbonate composition of an aromatic carbonate polymer and a linear polyester in intimate admixture with an unsized fibrous reinforcing agent and a small amount of a hydrogen siloxane.

BACKGROUND OF THE INVENTION

Incorporating fibrous reinforcements, such as glass fibers and rock wool fibers, into polycarbonate resins is known to improve dimensional stability, heat distortion temperature, creep resistance, tensile strength and, most dramatically, elastic modulus. However, this always results in a serious deterioration in overall ductility, manifested in poor notched and unnotched impact strength as well as a decreased falling ball impact strength. Even small amounts of fibrous reinforcements have a serious effect on the ductility of polycarbonate. If it is sought to improve impact performance by adding conventional impact modifiers, such as selectively hydrogenated styrene-butadiene styrene block copolymers, then there is a detrimental effect on stiffness (modulus) and only a minor improvement in impact strength, in any event. It has been found that elimination of the adhesive bond between polycarbonate and fibrous reinforcing agents can be accomplished by burning off or otherwise using fibers free of conventional sizing or coupling agents. This does improve ductility, but only for relatively small fiber contents, e.g., up to less than about 10% by weight of sizing-free glass fibers in the polycarbonate—this is usually below the optimum amount.

The ductility of the compositions mentioned above decreases even further when linear polyesters are blended in the fiber-reinforced polycarbonates in order to establish outstanding chemical resistance. Polycarbonates are known to have a very limited resistance against environmental stress crack conditions.

It has now been discovered that the addition of poly $C_1$-$C_{10}$alkyl (or phenyl) hydrogen siloxanes to compositions comprising "pristine" (or sizing-free) fibrous reinforcements and polycarbonates-polyester admixtures, in which the fiber content exceeds even 30%, results in a tremendous improvement in falling ball (ductile) impact strength, and notched impact and unnotched impact strengths, too. These can be improved by several hundred percent with almost full retention of the elastic modulus.

The foregoing is altogether surprising in light of Alewelt et al., U.S. Pat. No. 4,147,707, who describe glass fiber reinforced polycarbonates with improved mechanical properties containing 0.5 to 5.0% of organopolysiloxane. While U.S. Pat. No. 4,147,707 states that both long and short glass fibers can be used, Col. 3, lines 22–50, it is specified that they must be "provided with a polycarbonate-compatible finish by means of suitable sizes" (Col. 3, lines 25–27). The patent makes no distinction between conventional silicones, like polydimethyl siloxanes, and those containing silicone-hydrogen bonding. Applicant finds superior results with unsized glass fibers, if a hydrogen-siloxane is selected, and then used in amounts below 1.0%, and especially below the 0.5% lower limit of Alewelt et al. The falling ball ductile impact with such specific hydrogen polysiloxanes is, as will be illustrated later, more than ten times greater than with the dimethyl-polysiloxanes used in Alewelt et al. Bialous et al., U.S. Pat. No. 3,971,756 is also relevant to the present invention, but only insofar as it shows that from 0.01 to about 5 weight percent of a polysiloxane having silicon-bonded hydrogens can be used to prevent dripping in flame retardant polycarbonate compositions. Although the amounts and types of hydrogen siloxanes suggested in U.S. Pat. No. 3,971,756 are within the limits employed herein, and the inclusion of fibrous glass is suggested, the need for sizing-free fibers to enhance ductile impact is not at all evident.

It is believed that the following conditions are essential herein:

(i) sizing agents (on the fibrous reinforcement or separately added) must be absent because these either evoke adhesive bonds between the matrix and fiber, or they prevent reactions between the hydrogen polysiloxane and the fiber, or both:

(ii) a very good dispersion of the fibers in the matrix is required;

(iii) for best combination of high modulus and creep performance, the addition of polysiloxane is preferably kept below 1.0% and, especially preferably, below 0.5%; and (iv) the polysiloxane used must contain hydrogen silicon bonds.

Following the use, especially, of short glass fibers, additional advantages in improved isotropy and high surface quality are obtained. It is again reemphasized, that sizing agents must not be present to contribute to adhesive bonds between matrix and fibers, nor should they prevent reactions between the silicon-hydrogen bond-containing polysiloxane and the fibers. In practical terms this means that pristine fibers should be used. Using the factors mentioned above, the falling dart impact strength of a 20% short glass fiber-reinforced polycarbonate polyester blend can be increased from <5 J to 80 J, while the unnotched impact bar increased from about 400 to about 800 J/m. The new composition has a desirable high modulus. These results are evident at surprisingly low levels of hydrogen polysiloxane. Substantially the same results are also obtained with other fibrous fillers, pristine or virgin, including rock-wood-mineral fibers, carbon fibers, and the like.

SUMMARY OF THE INVENTION

According to the present invention, there are provided high impact strength, high modulus thermoplastic compositions comprising per 100 parts by weight (a), (b), (c) and (d), an intimate admixture of:

(a) an aromatic carbonate polymer or copolymer;

(b) a linear polyester, the combined amount of (a) and (b) consisting of from about 35 to 95 parts by weight of the total composition;

(c) from about 5 to about 65 parts by weight of a fibrous reinforcing agent essentially free of any sizing agent; and (d) from about 0.05 to about 4 parts by weight of a hydrogen siloxane comprising units of the formula

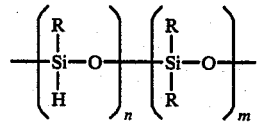

wherein R is hydrogen, $C_1$-$C_{10}$alkyl, phenyl or a mixture of any of the foregoing, and n plus m is at least 4, and, for example, up to about 200.

DETAILED DESCRIPTION OF THE INVENTION

The term "aromatic carbonate polymer or copolymer" is used in its broadest aspects. Suitable are those described in the above-mentioned U.S. Pat. Nos. 3,971,756 and 4,147,707, the disclosures of which are incorporated herein by reference. The aromatic carbonate polymers are homopolymers and copolymers that are prepared by reacting a dihydric phenol with a carbonate precursor. Suitable dihydric phenols are bis(4-hydroxyphenyl) methane; 2,2-bis(4-hydroxyphenyl)-propane (hereinafter referred to as bisphenol-A); 2,2-bis(4-hydroxy-3-methylphenyl)propane; 4,4-bis(4-hydroxyphenyl)heptane; 2,2-bis(4-hydroxy-3,5-dichlorophenyl)propane; 2,2-bis(4-hydroxy-3,5-dibromophenyl)propane; 2,2-bis(4-hydroxy-3,5-dimethylphenyl)propane, and the like; dihydric phenol ethers such as bis(4-hydroxy-phenyl)ether, and the like; dihydroxy-diphenyls, such as p,p'-dihydroxydiphenyl; 3,3'-dichloro-4,4'-dihydroxydiphenyl, and the like; dihydroxyaryl sulfones, such as bis(4-hydroxy-phenyl)-sulfone; bis(3,5-methyl-4-hydroxyphenyl)sulfone, and the like; dihydroxybenzenes; resorcinol hydroquinone, halo- and alkyl-substituted dihydroxybenzenes, such as 1,4-dihydroxy-2,5-dichlorobenzene; 1,4-dihydroxy-3-methyl-benzene, and the like; and dihydroxy diphenyl sufloxides, such as bis(3,5-dibromo-4-hydroxy-phenyl)-sulfoxide, and the like. A variety of additional dihydric phenols are also available to provide carbonate polymers and are disclosed in U.S. Pat. Nos. 2,999,835; 3,028,365; and 3,153,008. Also suitable for use as the aromatic carbonate polymer component (a) are copolymers prepared from any of the above copolymerized with halogen-containing dihydric phenols, such as 2,2-bis(3,5-dichloro-4-hydroxyphenyl)propane; 2,2-bis(3,5-dibromo-4-hydroxyphenyl)propane, and the like. It is contemplated to employ two or more different dihydric phenols or a copolymers of a dihydric phenol with a glycol or with hydroxy or acid terminated polyester, or with a dibasic acid in the event that a carbonate copolymer or interpolymer rather than a homopolymer is desired for use as component (a). Also contemplated for use are blends of any of the above aromatic carbonate polymers. Especially preferred dihydric phenols are bisphenol-A and 2,2-bis(4-hydroxy-3,5-dimethylphenyl)propane.

The carbonate precursor may be either a carbonyl halide, a carbonyl ester or a haloformate. The carbonyl halides which may be employed include a carbonyl bromide, carbonyl chloride and mixtures thereof. Typical of the carbonate esters are diphenyl carbonate, di(-halophenyl)-carbonate such as di(chlorophenyl)carbonate, di(bromophenyl)-carbonate, di(trichlorophenyl)-carbonate, di(tribromophenyl)-carbonate, and the like; di(alkylphenyl)carbonate, such as di(tolyl)carbonate, di(naphthyl)carbonate, di(chloronaphthyl)carbonate, and the like, or mixtures thereof. The haloformates of dihydric phenols are (bischloroformates of hydroquinone, etc.), or glycols (bis haloformates of ethylene glycol, neopentyl glycol, polyethylene glycol, etc.). While other carbonate precursors will occur to those skilled in the art, carbonyl chloride, also known as phosgene, is preferred.

Also contemplated are polymeric components (a) comprising units of a dihydric phenol, a dicarboxylic acid and carbonic acid, such as disclosed in U.S. Pat. No. 3,169,121, incorporated herein by reference.

The aromatic carbonate polymers used as component (a) herein are prepared preferably by employing a molecular weight regulator, an acid acceptor and a catalyst. Suitable molecular weight regulators are phenol, cyclohexanol, methanol, p-t-butylphenol, p-bromophenol, and the like.

A suitable acid acceptor may be either organic or inorganic. Illustrative of the former are tertiary amines, such as pyridine, triethylamine, dimethylaniline, tributylamine, and the like. Inorganic acid acceptors can comprise a hydroxide, a carbonate, a bicarbonate, a phosphate, or the like, of an alkali- or an alkaline earth metal.

The linear polyesters (b) used in the practice of the present invention are polymeric glycol esters of terephthalic and isophthalic acids. They are available commercially or can be prepared by known techniques such as by the alcoholysis of esters of the phthalic acid with a glycol and subsequent polymerization, by heating glycols with the free acids or with halide derivatives thereof, and similar processes. These are described in U.S. Pat. Nos. 2,465,319 and 3,047,539.

Although the glycol portion of the polyester can contain from two to ten carbon atoms, it is preferred that it contain from two to four carbon atoms in the form of linear methylene chains.

Preferred polyesters will be of the family consisting of high molecular weight, polymeric glycol terephthalates or isophthalates having repeating units of the general formula:

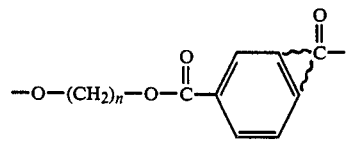

wherein n is a whole number from two to four, and mixtures of such esters, including copolyester of terephthalic and isophthalic acids.

Especially preferred polyesters are poly(ethylene terephthalate) and poly(1,4-butylene terephthalate).

The amounts of components (a), (b), (c), (d) and, optionally, (e) to be used have been broadly set forth above. Preferably, the siloxane will be present in an amount of from about 0.05 to less than 0.5, and especially preferably, about 0.4 parts by weight per 100 parts by weight of (a), (b) and (c) combined. Especially preferably the fibrous reinforcing agent will be present in an amount of from about 15 to about 40 parts by weight per 100 parts by weight of (a), (b) and (d) combined. Mixing temperatures and molding temperatures will be illustrated in the following examples but, in any event, they will correspond entirely to those well known to those skilled in the art of resin technology.

DESCRIPTION OF THE PREFERRED EMBODIMENTS

The following examples illustrate the compositions of the present invention. They are not to be construed as limiting the claims in any manner whatsoever.

EXAMPLES 1-6

Resin compositions are prepared by extruding a mixture of a homopolymer of 2,2-bis(4-hydroxyphenyl)propane (Bisphenol-A) and phosgene (LEXAN®125), a linear polyester, short milled glass fibers, essentially free of any sizing agent, and, where indicated, a polymethyl hydrogen siloxane fluid (DF 1040, General Electric Company). Extrusion is carried out at 265° C. and the extrudate is comminuted into pellets.

The pellets are then injection molded at about 300° C. (cylinder) for Examples A and B and 270° C. for Examples C, D, E and F into standard physical test specimens so that heat distortion temperature (HDT) can be measured according to standard test methods; Izod impact strength, notched and unnotched, can be measured by ⅛" bars according to standard test methods; falling ball impact strength can be measured on a 10 cm round disk according to standard test methods; elastic modulus and tensile yield strength and elongation at yield and at break can be measured by standard test methods.

The compositions used and the properties observed are set forth in Table 1.

TABLE 1
Short Fiber Reinforced Polycarbonate-Polyester Compositions

|  | A | B | C | D | E | F |
|---|---|---|---|---|---|---|
| Composition (parts by weight) | | | | | | |
| Poly(bisphenol-A carbonate)[a] | 45 | 45 | 45 | 45 | 30 | 30 |
| Poly(ethylene terephthalate) | 35 | 35 | — | — | — | — |
| Poly(1,4-butylene terephthalate) | — | — | 35 | 35 | 45 | 45 |
| Short unsized glass fibers[b] | 20 | 20 | 20 | 20 | 20 | 20 |
| Poly(methyl hydrogen siloxane)[c] | — | 0.5 | — | 0.5 | — | 0.5 |
| Kraton G 1651 | — | — | — | — | 5 | 5 |
| Properties | | | | | | |
| Vicat B (120/50N) | 147 | 146 | 135 | 124 | 131 | 131 |
| Melt Viscosity, 300° C. Pa-s. | 380 | 370 | — | — | — | — |
| Melt Viscosity, 260° C. Pa-s. | — | — | 430 | 430 | 360 | 360 |
| Heat Distortion Temperature, °C. | 131 | 130 | 117 | 113 | — | — |
| Tensile Modulus, N/mm$^2$ | 4200 | 4120 | 4170 | 3960 | 3410 | 3300 |
| Tensile Strength, N/mm$^2$ | 64 | 52 | 62 | 51 | 60 | 39.8 |
| Elongation at break, % | 5.6 | 20 | 4.5 | 30 | 4.5 | 16 |
| Time to failure in gasoline at 1% strain | No failure in twenty-four hours | | | | | |
| Whitening in gasoline | No | No | No | No | No | No |
| Izod Impact: | | | | | | |
| notched: /m | 90 | 130 | 90 | 135 | 48 | 105 |
| unnotched: /m | 430 | 800 | 400 | 800 | 450 | 1150 |
| Falling ball impact, 10 Kg; h = var.; φ 10 cm disc; w = 3.2 mm; φ 9.5 cm support ring | <5 | 80 | <5 | 60 | <5 | 85 |

[a]LEXAN® 125, General Electric Company
[b]EC 10W, Gevetex Company
[c]DF 1040, General Electric Company Obviously, many variations are possible in the light of the above detailed description. For example, the bisphenol-A polycarbonate can be substituted with a polycarbonate from tetramethylbisphenol-A. The poly(methyl hydrogen)siloxane can be substituted with a poly(phenyl hydrogen)siloxane. Instead of short glass fibers, unsized long glass fibers can be substituted. An impact improving amount, i.e. 5% by weight, of a selectively hydrogenated block copolymer of styrene-butadiene-styrene, such as Shell's Kraton G, can be included in the composition. For the polycarbonate, there can be substituted polyester carbonate, polycarbonate siloxane copolymers and blends thereof. All such obvious variations are within the full intended scope of the appended claims.

Conventional additives, such as anti-static agents, pigments, mold release agents, thermal stabilizers, and the like can be present in component (a).

The fibrous reinforcing agent (c) can vary widely in nature and type, so long as it is "pristine", that is, essentially free of any sizing materials, as mentioned above. There can be used glass fibers, mineral fibers, such as rockwool, asbestos, and the like, carbon fibers, and others. Preferred are glass fibers and rockwool fibers.

Like the above-mentioned U.S. Pat. No. 4,147,707, suitable fibers, e.g., glass fibers, are all the commercially available kinds and types, such as cut glass filaments (long glass fiber and short glass fiber), rovings and staple fibers.

The length of the filaments, whether or not they have been bundled to form fibers, should be between about 60 mm and 6 mm, for long fibers and between about 5 mm and 0.05 mm in the case of short fibers. Alkali-free aluminum-boron-silicate glass ("E" glass) or alkali containing glass ("C" glass) can be used, as well as others. Preferred in a ground short glass fiber.

Any of the hydrogen polysiloxanes known in the art can serve as component (d). Especially useful are those set forth by formula in the above-mentioned U.S. Pat. No. 3,971,756. The patent also cites U.S. Pat. Nos. 2,445,794; 2,448,756; 2,484,595 and 3,514,424 as showing ways of making such siloxanes. To save unnecessarily detailed description, these are all incorporated herein by reference. Most important members of the family are those in which R is methyl, or phenyl, or a mixture thereof. These are commercially available. At the present time, it is preferred to use poly(methyl hydrogen)siloxane, a fluid which is available commercially from General Electric Company under the trade deisngation DF-1040.

In some embodiments, it is contemplated to use a small amount, e.g., up to 10 parts by weight per 100 parts by weight of (a), (b), (c) and (d) combined, of an impact modifier (e). This can comprise a polyacrylate, or a copolymer of a diene and acrylonitrile and/or vinyl aromatic compound. A preferred such modifier is a block copolymer, of the linear or radial type, comprising diene rubber center blocks and vinyl aromatic terminal blocks. Illustrative dienes are butadiene or isoprene, and illustrative vinyl aromatics are styrene, vinyl toluene, and the like. Especially suitable are selectively hydrogenated such compounds. Particularly valuable are the selectively hydrogenated linear ABA types, made from styrene (A) and butadiene (B), and sold by Shell Chemical under the tradename Kraton G, and the corresponding radial teleblocks sold by Phillips Chemical under the tradename Solprene.

Any conventional method can be used to formulate the present thermoplastic compositions, and to mold them. The important factor is to insure intimate admixture.

What is claimed is:

1. A high impact strength, high modulus thermoplastic composition comprising an intimate admixture of:
   (a) an aromatic carbonate polymer or copolymer;
   (b) a linear polyester having repeating units of the formula:

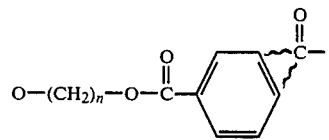

wherein n is a whole number from two to four, the total weight of (a) plus (b) being from about 35 to about 95 parts of the composition:
   (c) from about 65 parts by weight of a fibrous reinforcing agent essentially free of any sizing agent; and
   (b) from about 0.05 to about 4 parts by weight of an added hydrogen siloxane comprising units of the formula:

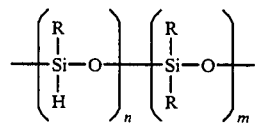

wherein R is hydrogen, $C_1$-$C_{10}$alkyl, phenyl, or a mixture thereof, and n plus m is at least about 4.

* * * * *

UNITED STATES PATENT AND TRADEMARK OFFICE
CERTIFICATE OF CORRECTION

PATENT NO. : 4,568,712
DATED : February 4, 1986
INVENTOR(S) : Van Abeelen et al

It is certified that error appears in the above—identified patent and that said Letters Patent is hereby corrected as shown below:

Add Claims 2-6:

--2. The composition of Claim 1 wherein the siloxane is present in an amount of from about 0.05 to less than 0.5 parts by weight per 100 parts by weight of the total composition.--

--3. The composition of Claim 1 wherein the aromatic carbonate polymer is the reaction product of 2,2-bis(4-hydroxyphenyl) propane and phosgene.--

--4. The composition of Claim 1 wherein the aromatic carbonate is the reaction product of 2,2-bis(4-hydroxy-3,5-dimethylphenyl) propane and phosgene.--

--5. The composition of Claim 1 wherein the linear polyester is poly(ethylene terephthalate), poly(1,4-butyleneterephthalate) or mixtures thereof.--

UNITED STATES PATENT AND TRADEMARK OFFICE
CERTIFICATE OF CORRECTION

PATENT NO. : 4,568,712
DATED : February 4, 1986
INVENTOR(S) : Van Abeelen et al

It is certified that error appears in the above—identified patent and that said Letters Patent is hereby corrected as shown below:

--6. The composition of Claim 1 wherein the fibrous reinforcing agent comprises glass fibers or rockwool fibers.--

Signed and Sealed this

Eighth Day of July 1986

[SEAL]

Attest:

Attesting Officer

DONALD J. QUIGG

Commissioner of Patents and Trademarks